Oct. 24, 1939.  C. BICHI  2,177,381
HYDRAULIC DRIVE MEANS FOR BICYCLES
Filed April 24, 1939  3 Sheets-Sheet 1

INVENTOR,
Conrad Bichi
BY J. E. Trabucco
ATTORNEY

Oct. 24, 1939.　　　　　C. BICHI　　　　　2,177,381
HYDRAULIC DRIVE MEANS FOR BICYCLES
Filed April 24, 1939　　　3 Sheets—Sheet 2

INVENTOR,
Conrad Bichi
BY
J. E. Trabucco
ATTORNEY

Oct. 24, 1939.  C. BICHI  2,177,381
HYDRAULIC DRIVE MEANS FOR BICYCLES
Filed April 24, 1939  3 Sheets-Sheet 3
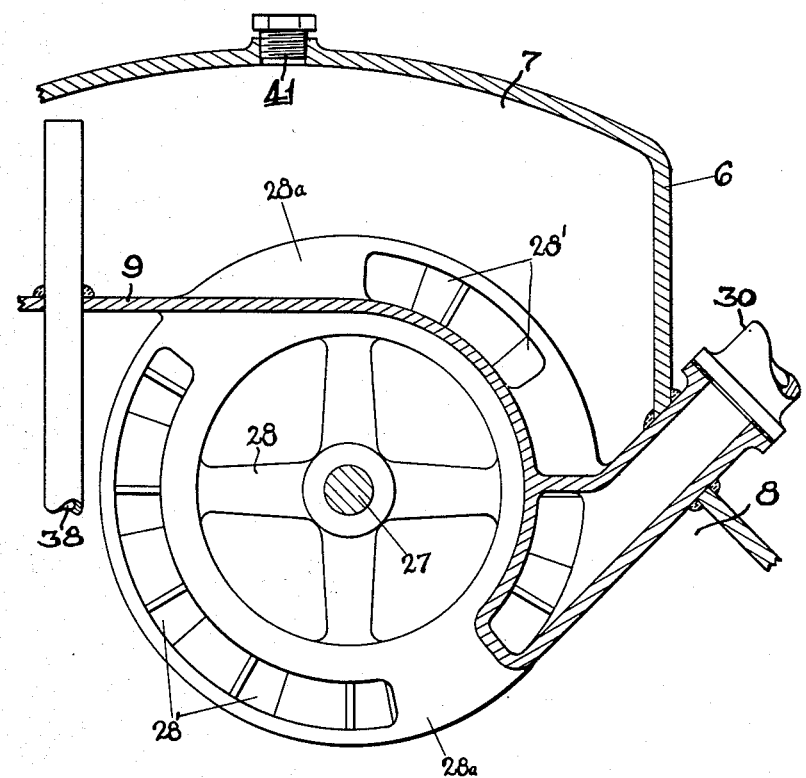
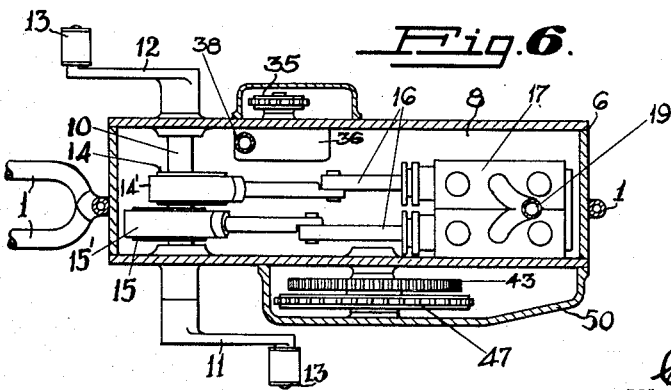
INVENTOR
Conrad Bichi
BY J. E. Trabucco
ATTORNEY Patented Oct. 24, 1939

2,177,381

UNITED STATES PATENT OFFICE 2,177,381

HYDRAULIC DRIVE MEANS FOR BICYCLES

Conrad Bichi, San Francisco, Calif.

Application April 24, 1939, Serial No. 269,695

5 Claims. (Cl. 280—216)

This invention relates to improvements in hydraulic drive means for bicycles.

An object of my invention is to provide an improved hydraulic drive for bicycles which embodies novel means for storing up energy from the pedaling operation during times when the rider is traversing a level or down grade, the said stored up energy being releasable at any time when additional power for the propulsion of the bicycle is required.

Another object of my invention is to provide an improved hydraulic drive means for bicycles having a fluid pump operable by the rotary movement of the foot pedals for forcing a pressure fluid into a storage chamber where a series of springs may be compressed to store up energy to be utilized when required to impart added power to the bicycle's propulsion.

Other and further objects of my invention will be pointed out hereinafter or will be indicated in the appended claims, or will be obvious to one skilled in the art upon an understanding of the present disclosure. For the purpose of this application I have elected to show herein certain forms and details of a hydraulic drive means for bicycles representative of my invention; it is to be understood, however, that the embodiments of my invention herein shown and described are for the purpose of illustration only, and that therefore it is not to be regarded as exhaustive of the variations of the invention, nor is it to be given an interpretation such as might have the effect of limiting the claims short of the true and most comprehensive scope of the invention in the art.

In the accompanying drawings:

Fig. 5 is an enlarged vertical section taken on the line 5—5 of Fig. 3; and

Fig. 6 is a sectional view taken on the line 6—6 of Fig. 2.

Figure 1:
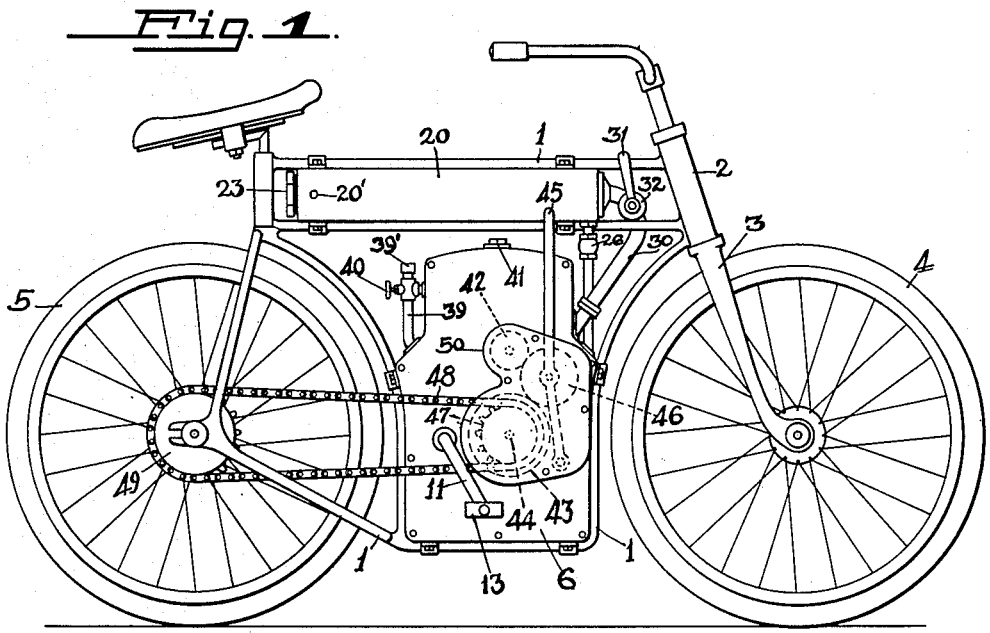
Fig. 1 is a side elevation of a bicycle having my improved hydraulic drive means applied thereto.
Figure 2:
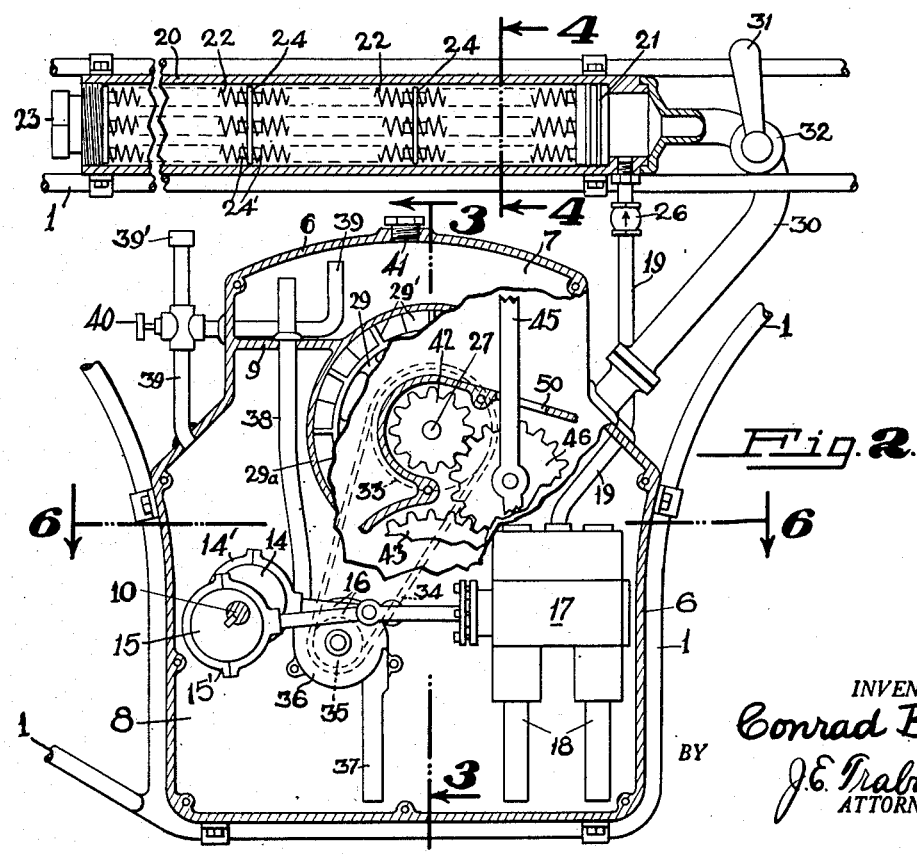
Fig. 2 is an enlarged side elevation, partly in section, of my hydraulic drive means.
Figure 3:
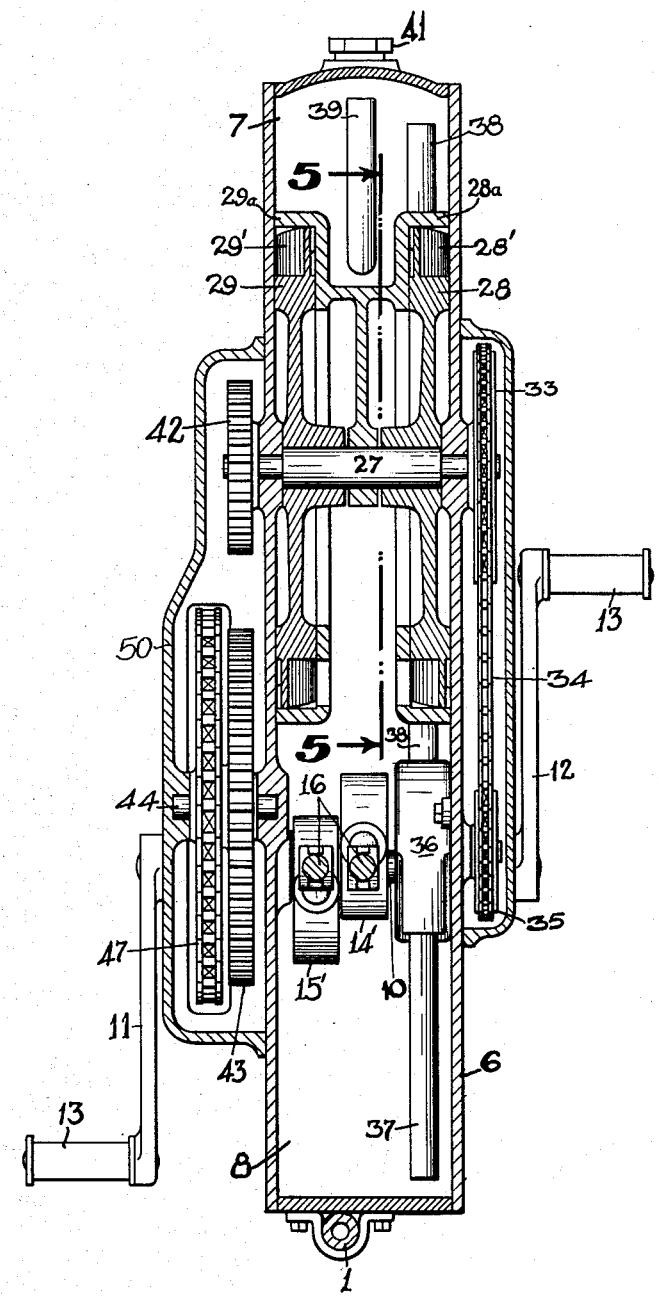
Fig. 3 is a sectional view taken on the line 3—3 of Fig. 2.
Figure 4:
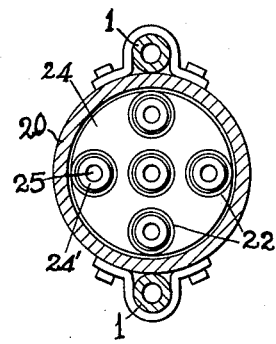
Fig. 4 is a sectional view taken on the line 4—4 of Fig. 2.

Referring to the drawings, the numeral 1 designates the frame of a bicycle having a head 2 at its front end through which a rotatable fork 3 is journaled. The front wheel 4 is rotatably mounted on the fork 3 and the rear wheel 5 is rotatably mounted on the rear end of the frame 1.

Suitably supported on the frame 1 between the front and rear wheels is a main casing 6 having its interior divided into upper and lower chambers or compartments 7 and 8 by a substantially horizontal partition 9.

Opposite sides of the casing 6 are provided with suitable bearing means which rotatably support a transversely disposed pedal shaft 10 having at its outer ends pedal cranks 11 and 12 to which are attached the usual pedals 13. Secured to the pedal shaft at points inside the casing 6 are two eccentrics 14 and 15 which respectively have suitable collars 14' and 15' movably mounted thereon. The collars are each operatively connected by means of connecting rods 16 to a fluid pump 17. The pump is provided with depending inlet pipes 18 which normally extend into a liquid, such as oil, normally located on the bottom of the casing 6. The operation of the pedal shaft 10 by a rider actuating the pedals in the usual manner, will cause the operation of the pump 17. The discharge side of the pump is connected by a pipe 19 to the forward end of a pressure cylinder 20 which is mounted at the upper side of the frame 1. Slidably positioned in the cylinder 20 is a closely fitting piston 21 which is urged forwardly by a plurality of compression springs 22 located between it and the removable rear end 23 of the said cylinder.

In the particular embodiment shown on the drawings, the springs 22 are arranged in groups or batteries of five in which one group is separated from another group by a disc 24 having tubular bosses 24' projecting from each side thereof. The bosses serve to hold the ends of the springs in proper spaced relation with respect to each other. The discs 24 are provided with a series of air holes 25 at points where the tubular bosses are located, thereby providing means for allowing air to escape through the discs when the piston 21 is moved first to compress the springs and then in the opposite direction when they become distended. The rear end of the cylinder 20 is provided with one or more air holes 20' for the passage of air to and from the cylinder when the piston 21 is reciprocated. A check valve 26 connected in the line 19 serves to allow the pressure fluid to be pumped to the cylinder 20, but it is so constructed and arranged as to prevent the said fluid from returning in the opposite direction through the said line.

Axially secured to a transversely disposed shaft 27 extending across the interior of the casing 6 are two rotors 28 and 29 having vanes 28' and 29' arranged circumferentially therearound. The annularly arranged vanes 28' and 29' of the two rotors are substantially enclosed by housings 28a and 29a, respectively. Each of the vane housings 28a and 29a is provided with fluid inlet openings at their upper sides for the admittance of fluid from the chamber 7 (see Fig. 5), and with similar openings at their lower sides for the discharge of fluid into the chamber 8. Connected to the periphery of the housings 28a and 29a at predetermined points and beneath the partition 9 is a pipe 30 which is connected at its upper end to the forward end of the pressure cylinder 20. A hand operated throttle control member 31 serves to operate a throttle valve 32 connected in the line 30. Fluid under pressure passing through the pipe 30 into the housings 28a and 29a engages with and actuates the vanes 28' and 29' in a clockwise direction, thereby causing the rotors 28 and 29 to similarly rotate. So that certain areas of the vane housings 28a and 29a may be substantially filled with fluid at points where the incoming pressure fluid from the cylinder 20 impinges upon the vanes, the chamber 7 is arranged to supply such fluid through the inlet openings at the upper side of said housings. Since the particular areas of the housings 28a and 29a which are located where the pipe 30 joins the latter, are normally filled with fluid supplied from the chamber 7, the pressure fluid entering from the pressure cylinder 20 reacts immediately upon the vanes and thereby causes the effective rotation of the rotors 28 and 29. The fluid entering the vane housings 28a and 29a from the pressure cylinder 20 and the chamber 7 escapes from the said housings through the openings in the lower sides of the latter, and thereupon falls onto the bottom of the chamber 8.

Secured to one end of the shaft 27 at a point outside the casing 6 is a sprocket 33 about which is trained a chain 34 leading around a sprocket 35 operatively connected to a fluid pump 36. The suction side of the fluid pump 36 is connected to a depending pipe 37 which extends into the fluid normally resting on the bottom of the casing 6. The discharge side of the pump 36 is connected by a pipe 38 to the chamber 7. Thus upon the rotation of the rotors 28 and 29 fluid is pumped from the bottom of the casing into the chamber 7 where it is available for use in assisting in the rotation of the said rotors as heretofore described. So as to prevent the building up in the chamber 7 of an excessive pressure or of an excessive amount of fluid, a drain pipe 39 having a regulating valve 40 thereon is arranged to convey the fluid back to the chamber 8 when it reaches a certain level in the chamber 7. An extension 39' on the drain pipe 39 is open to the outer atmosphere, thereby allowing air to be drawn into or expelled from the chambers 7 and 8 as the fluid supply decreases or increases in the latter. A suitable threaded opening in the wall at the upper side of the casing 6, through which oil or other suitable liquid may be poured to supply the motor with an operating fluid, is normally closed by plug 41.

Secured to the opposite end of the shaft 27 is a gear 42 which is positioned directly above but in spaced relation to a larger circular gear 43, the latter being secured to a rotatable axle 44. Rotatably mounted on a pivoted hand control lever 45 is a connecting gear 46 which may be brought into mesh with the gears 42 and 43 by pulling the upper end of the control lever rearwardly. The engagement of the gear 46 with the gears 42 and 43 causes the latter gear to be operated by the rotors 28 and 29.

Also secured to the rotatable axle 44 is a sprocket 47 which is connected by a chain 48 to a sprocket 49 secured axially to the rear wheel 5 of the bicycle. Thus when the connecting gear 46 is moved into operative engagement with the gears 42 and 43 the hydraulic power from the cylinder 20 is transferred to the rear wheel 5 and the latter is rotated. The lever 45 may be conveniently manipulated to control the hydraulic operation of the bicycle, or if desired the hand throttle 31 may be used for the same purpose.

The gears 42, 43, 46 and 47 are preferably enclosed by a suitably shaped housing 50 which is secured to a side of the casing 6.

The operation of the device is as follows:
The rider actuates the pedals 13 in the usual manner, thereby causing the eccentrics 14 and 15 to operate the fluid pump 17 through the connecting rods 16. The fluid pump discharges fluid contained in the compartment 8 under pressure into the front end of the pressure cylinder 20, thereby forcing the piston 21 in a rearward direction. The movement toward the rear of the piston causes the springs 22 to become compressed, thereby storing up energy for future use. The throttle control member 31 is suitably manipulated to allow fluid to be discharged under pressure from the pressure cylinder 20 through the pipe 30 to the vane housings 28a and 29a, where it is utilized to rotate the rotors 28 and 29. The hand control lever 45 is then manipulated to bring the gear 46 into connected relationship with the gears 42 and 43, thereby causing the rear wheel 5 of the bicycle to be actuated. Co-incident with the consequent propulsion of the bicycle the pump 17 is operated to pump some of the fluid coming back into the chamber 8 from the vane housings 28a and 29a to the pressure cylinder 20. At the same time the pump 36 is operated to pump some of the fluid in the chamber 8 back into the chamber 7 where it is available for use in assisting in the rotation of the rotors 28 and 29. The manipulation of the hand throttle member 31 may be resorted to for the control of the bicycle's operation.

Having described my invention, what I claim is:

1. In drive means for bicycles or the like, a frame mounted on a plurality of wheels, a casing mounted on the frame having a fluid containing chamber, a pressure cylinder mounted on the frame having a fluid inlet and a separate fluid outlet at one end, a reciprocating piston in the cylinder, compressible spring means urging the piston toward the fluid outlet whereby fluid under pressure may be discharged from the outlet, a fluid pump connected to the fluid inlet for pumping fluid from the chamber of the casing to the pressure cylinder, crank means operable by a rider of the bicycle for actuating the pump, a fluid rotatable rotor operatively connected to a wheel of the bicycle, whereby upon the rotor being rotated the bicycle may be propelled, and means for directing pressure fluid from the outlet of the pressure cylinder to the rotor, whereby the rotor may be actuated by the pressure fluid to propel the bicycle.

2. In drive means for bicycles or the like, a frame mounted on a plurality of wheels, a casing mounted on the frame having a fluid containing chamber, a pressure cylinder mounted on the frame having a fluid inlet and a fluid outlet at an end thereof, a reciprocating piston in the cylinder, compressible spring means for urging the piston toward the fluid outlet whereby fluid under pressure may be discharged from the outlet, a fluid pump connected to the fluid inlet for pumping fluid from the chamber of the casing to the pressure cylinder, manually operable means for operating the pump, rotor means operatively connected to a wheel of the bicycle, whereby upon the rotor means being rotated the bicycle may be propelled, means for directing pressure fluid from the outlet of the pressure cylinder to the rotor means, whereby the rotor means may be actuated by the pressure fluid to propel the bicycle, and control means for the pressure fluid directed to the rotor means.

3. In drive means for bicycles or the like, a frame mounted on a plurality of wheels, a casing mounted on the frame having a fluid containing chamber, a pressure cylinder having a fluid inlet and a fluid outlet adjacent one end thereof, a reciprocating piston in the cylinder, means for urging the piston toward the outlet whereby fluid under pressure may be expelled from the cylinder, a fluid pump connected to the fluid inlet for pumping fluid from the chamber of the casing to the pressure cylinder, manually operable means on the bicycle for operating the pump, rotor means responsive to pressure fluids directed thereon, means operatively connecting the rotor means to a wheel of the bicycle, whereby upon rotation of the rotor means the bicycle may be propelled, means for directing pressure fluid from the outlet of the cylinder to the rotor means, whereby the rotor means may be rotated to propel the bicycle, and a hand operated control for controlling the pressure fluid directed to the rotor means, whereby the power applied to the rotor means for the operation of the bicycle may be controlled.

4. In drive means for wheeled vehicles, a frame mounted on a plurality of wheels, a casing mounted on the frame having a fluid containing chamber, a pressure cylinder having a fluid inlet and a fluid outlet adjacent one end thereof, a reciprocating piston in the cylinder, resilient compressible means for urging the piston toward the outlet whereby fluid under pressure may be expelled from the cylinder, a fluid pump connected to the fluid inlet for pumping fluid from the chamber of the casing to the pressure cylinder, whereby the piston may be actuated so the compressible means may be compressed, manually operable means for operating the pump, a plurality of rotors adapted to be rotated by pressure fluid directed thereon, means operatively connecting the rotors to a wheel of the vehicle, whereby upon rotation of the rotors the vehicle may be propelled, means for directing pressure fluid from the outlet of the cylinder to the rotors, whereby the rotors may be rotated to propel the vehicle, and hand control means for controlling the flow of pressure fluid to the rotors.

5. In drive means for wheeled vehicles, a frame mounted on a plurality of wheels, a casing mounted on the frame having its interior divided into upper and lower fluid containing chambers, a pressure cylinder having a fluid inlet and a fluid outlet, a reciprocating piston in the cylinder, resilient compressible means in the cylinder for urging the piston toward the outlet whereby fluid may be expelled under pressure from the outlet, a fluid pump connecting the lower chamber of the casing with the inlet of the pressure cylinder, whereby pressure fluid may be supplied to the cylinder to actuate the piston in a direction whereby the compressible means may be compressed, manually operable means on the vehicle for operating the pump, rotor means adapted to be actuated by pressure fluid directed thereon, means operatively connecting the rotor means to a wheel of the vehicle, whereby upon rotation of the rotor means the vehicle may be propelled, means for directing pressure fluid from the outlet of the pressure cylinder to the rotor means whereby the rotor means may be rotated to propel the vehicle, a second pump for pumping fluid from the lower chamber to the upper chamber, means operatively connecting the second pump with the rotor means, and means for supplying fluid from the upper chamber to the rotor means, whereby the rotor means may be assisted in its operation by said fluid delivered thereto.

CONRAD BICHI.